United States Patent
Perrin

[11] 3,828,463
[45] Aug. 13, 1974

[54] DROP SPIN FISHING LURE
[75] Inventor: George S. Perrin, Fort Smith, Ark.
[73] Assignee: Plastic Research and Development Corporation, Fort Smith, Ark.
[22] Filed: Feb. 26, 1973
[21] Appl. No.: 336,038

[52] U.S. Cl............... 43/42.11, 43/42.28, 43/42.39
[51] Int. Cl............................................. A01k 85/00
[58] Field of Search............ 43/42.11, 42.13, 43.13, 43/44.81, 42.42, 42.28, 42.39

[56] References Cited
UNITED STATES PATENTS
| | | | |
|---|---|---|---|
| 2,281,578 | 5/1942 | Heddon | 43/42.13 |
| 3,012,356 | 12/1961 | Tyson | 43/42.11 |
| 3,673,726 | 7/1972 | La Montagne | 43/42.39 |

Primary Examiner—Warner H. Camp
Attorney, Agent, or Firm—Fishburn, Gold & Litman

[57] ABSTRACT

An artificial fishing lure has a hollow or floater body member with a line shank extending forwardly and downwardly therefrom and having an eye for connection of a fishing line. A weight member is mounted on a weight support shaft extending rearwardly from the eye of the line shank below and at an angle relative to the body member for a desired angular relation ahd having a spinner or action member mounted on a rear end of the weight support shaft. A hook shank extends rearwardly from the hollow body member and has a down-turned portion terminating in a barb at the free end thereof, the lure having a suitable skirt or the like on the body and extending around the hook.

7 Claims, 6 Drawing Figures

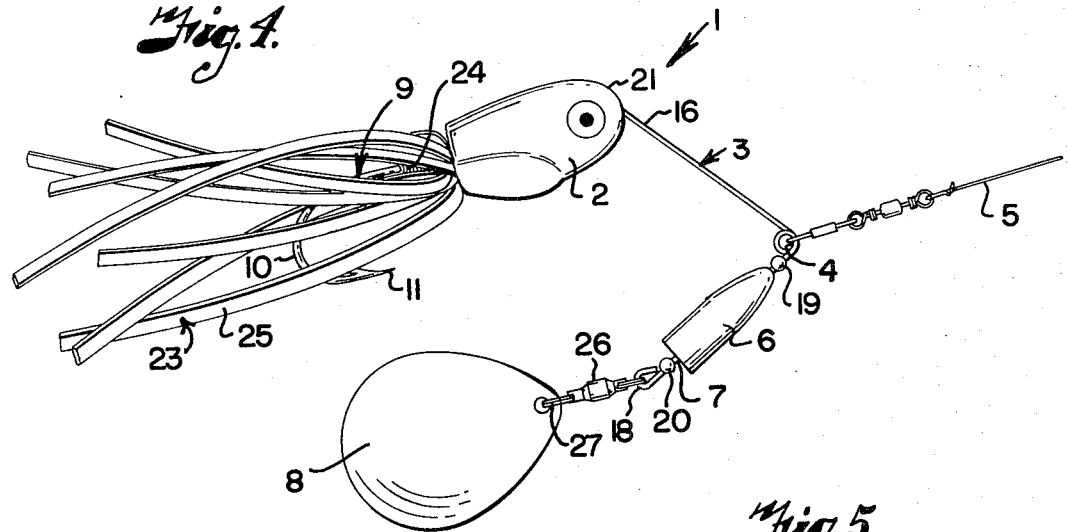
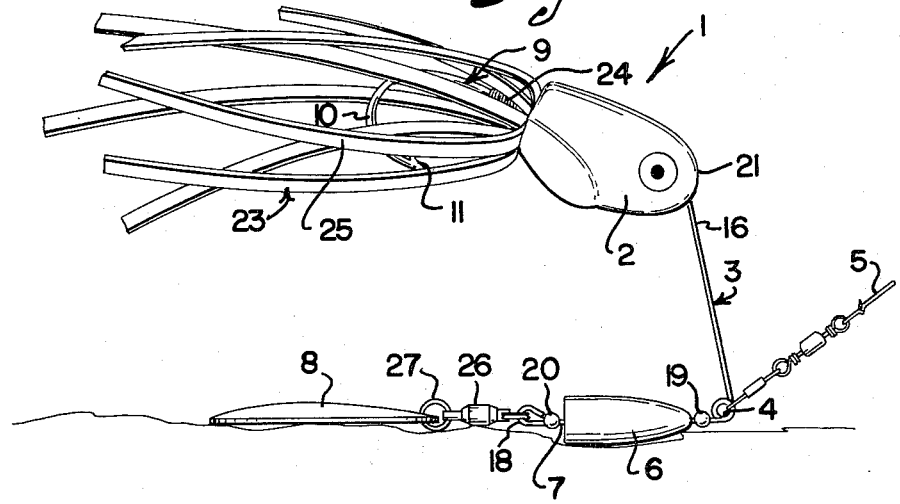
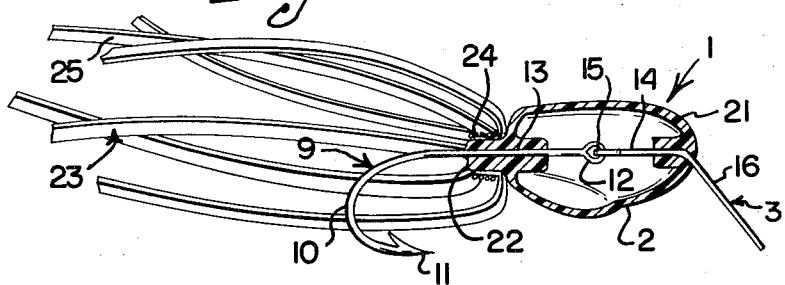

DROP SPIN FISHING LURE

The present invention relates to an improved artificial fishing lure which is appropriately designed and constructed to position a barb above a bottom surface of a body of water when a portion of the fishing lure is in engagement therewith.

The principal objects of the present invention are: to provide an improved artificial fishing lure having a hollow body and a weight spaced therefrom to stabilize the lure in an upright position when falling or being retrieved through water; to provide such an artificial fishing lure which has the line attachment weight body and hook arranged to be moved up and over obstructions as the lure is retrieved or when at rest on the bottom thereby avoiding fouling of the hook or hanging up on obstructions; to provide such an artificial fishing lure which has improved body vibration when being retrieved with the vibration being transferred to a skirt thereby producing a more attractive action; to provide such an improved artificial fishing lure with increased visibility when allowed to rest on the bottom of a body of water and which has the barb of a hook positioned at the best location for positive penetration; to provide such an artificial fishing lure having a barb on the end of a downwardly turned portion to substantially reduce fouling and snagging when retrieving the fishing lure through weeds, moss, or other obstructions; to provide such an artificial fishing lure wherein the barb is positioned at an angle of attack to hook the fish deeper and in a lower portion of the mouth thereof where the tissue is softer, thereby giving better hook penetration and holding ability; and to provide such an artificial fishing lure which is economical to manufacture, easily maintained, and particularly well adapted for the proposed use.

Other objects and advantages of this invention will become apparent from the following description taken in connection with the accompanying drawings wherein are set forth by way of illustration and example certain embodiments of this invention.

The drawings constitute a part of this specification and include an exemplary embodiment of the present invention and illustrate various objects and features of the artificial fishing lure.

FIG. 4 is a side elevational view showing the fishing lure being pulled through water.

FIG. 5 is a side elevational view showing the fishing lure at rest on the bottom of a body of water.

FIG. 6 is a fragmentary, longitudinal, sectional view through the fishing lure and showing a connection between a line shank and a hook shank.

Figure 1:
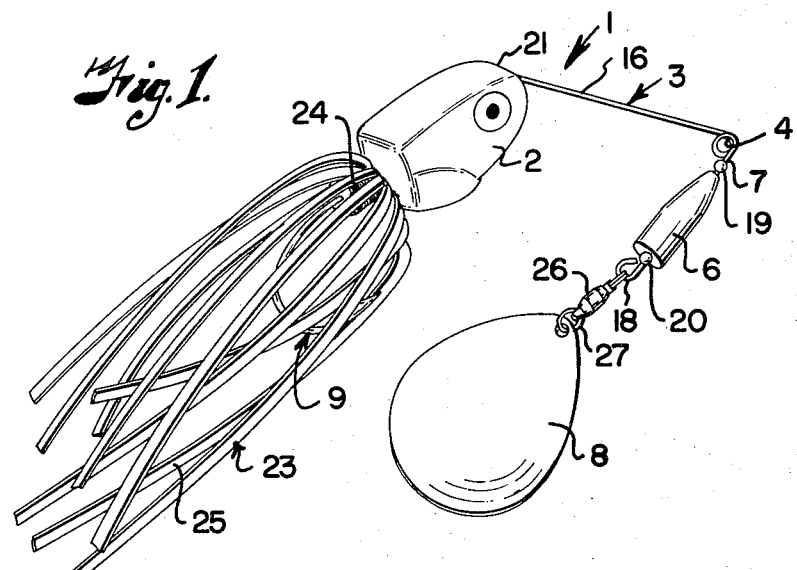
FIG. 1 is a perspective view of an artificial fishing lure embodying features of the present invention.
Figure 2:
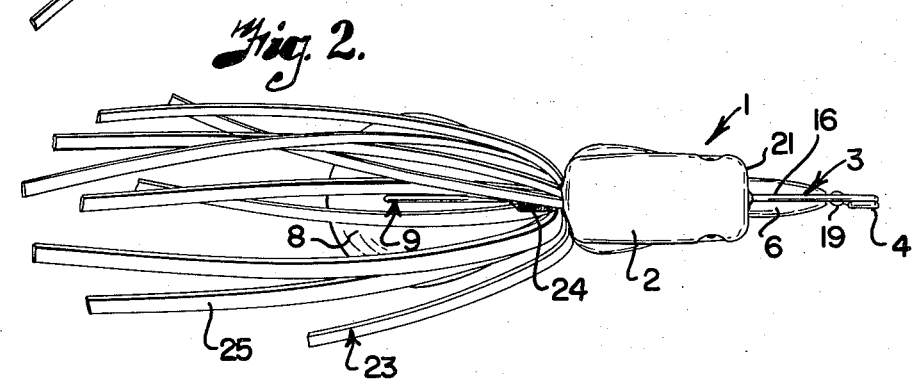
FIG. 2 is a top plan view of the fishing lure.
Figure 3:
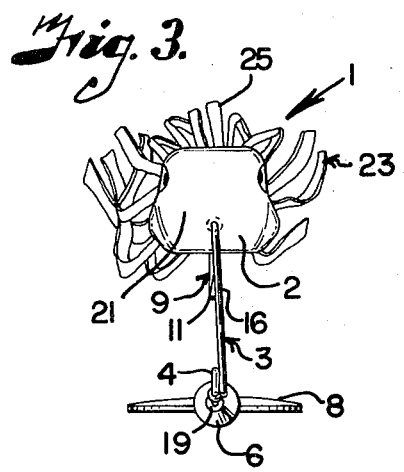
FIG. 3 is a front elevational view of the fishing lure.

Referring more in detail to the drawings:

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

In the disclosed embodiment of the present invention, the reference numeral 1 generally designates an artificial fishing lure having a body member 2 adapted to float in water with a line shank 3 extending forwardly and downwardly from the body member 2 and having an eye 4 permitting connection of a fishing line 5 thereto. A weight member 6 is mounted on a weight connection 7 extending from the eye 4 of the line shank 3. A spinner or action member 8 is illustrated as being mounted on a rear end of the weight connector 7. A hook shank 9 extends rearwardly from the hollow body member 2 and has a downturned portion 10 terminating in a barb 11 at the free end thereof.

The hook shank 9 is preferably a substantially rigid member, such as a steel wire or the like, and has a portion 12 within the body member 2. The illustrated hook shank 9 has a straight portion 13 positioned substantially on the longitudinal axis of the body member and extending between the portion 12 and the downturned portion 10. The downturned portion 10 of the hook shank 9 is a return bend extending through approximately 180° whereby the barb 11 is positioned below and rearwardly of the body member 2.

The line shank 3 is also preferably a substantially rigid member, such as a steel wire or the like, and has a first portion 14 positioned within the hollow body member 2 and having a suitable connection 15 with the hook portion 12. The line shank 3 has a second portion 16 connected to the first portion 14 by a bend and the second portion 16 extends forwardly and downwardly from a front end of the body member 2 and terminates in the eye 4 at the lower end of the second portion 16. The second portion 16 of the line shank is at an obtuse angle to the longitudinal axis of the body member 2 and the hook shank, as for example approximately 120 to 135°.

A weight support connection is illustrated as a support shaft 7 having a forward end thereof connected to the eye 4 and extending generally rearwardly therefrom and terminating in a loop portion 18 for attachment of a spinner or other action member 8 thereto. The line shank 3, hook shank 9, and weight support shaft 7 are substantially coplanar thereby providing minimum resistance to movement of the artifcial fishing lure 1 through the water and minimum possibility of fouling of the fishing lure 1 on obstructions within the water.

The weight member 6 provides weight for the fishing lure 1 and is preferably formed of a heavy formable material, such as lead that may be cast to any desired shape. The illustrated weight member 6 is generally round or ovate in transversed cross-sections and generally bullet shaped to thereby provide a streamlined shape for easy and rapid movement through water.

It is preferable that the weight member 6 be rotatably mounted on the weight support shaft 7 and be positioned between suitable movement limiting portions or members 19 and 20 which are also preferably rotatably mounted on the weight support shaft 7. The spacing between the eye 4 and the loop portion 18 of the weight support shaft 7 is greater than the combined longitudinal dimension of the weight member 6 and the movement limiting portions 19 and 20 whereby the weight member 6 and the movement limiting portions 19 and 20 are movable longitudinally along the weight support shaft 7 in response to engagement with obstructions in the water.

The body member 2 is preferably molded of suitable plastics including synthetic resins or the like and may be of any desired shape providing a substantially streamlined movement through the water. In the illustrated structure, the body member 2 has a generally rounded front end 21 having a passage therein adapted to receive the bend connecting the first and second portions 14 and 16 respectively of the line shank 3. The body member 2 includes a tail portion 22 projecting rearwardly from the rear end of the body member 2 and having a passage therethrough adapted to receive therein a portion of the straight portion 13 of the hook shank 9.

An action member, such as a skirt 23, is mounted on the tail portion 22 of the body member 2 and is adapted to provide an improved attractive action to game fish and the skirt 23 partially conceals the hook shank 9. The illustrated skirt 23 has a sleeve portion overlying the tail portion 22 and the sleeve portion is retained in engagement with the tail portion 22 by means of a wrapping 24. The skirt 23 includes a plurality of tentacles 25 extending from the sleeve portion and around a portion of the hook shank 9 and around a portion of the downturned portion 10 of the hook shank 9.

It is preferable to form the skirt 23 of a suitable flexible resilient material, such as rubber, plastic, nylon or the like, which is cut into a plurality of narrow strips or fibers to form the tentacles 25 which extend rearwardly from adjacent a rear end of the body member 2 when the lure is pulled through the water thereby substantially concealing the barb 11 of the hook shank 9. The tentacles 25 wave or move in the water in response to movement of the water or currents therein thereby visually attracting game fish.

The spinner or action member 8 is mounted on the weight support shaft 7 and is adapted to provide an improved action when the fishing lure 1 is pulled through the water. A swivel 26 is connected to the loop portion 18 of the weight support shaft 7 and to an eye or ring 27 connected to the spinner 8.

The hollow body member 2 is preferably formed of substantially identical side sections which are suitably joined together, as by glue. Forming the artificial fishing lure 1 includes placing the loop portion 15 of the line shank 3 in the eye portion 12 of the hook shank 9 and placing a portion of the straight portion 13 in the passage through the tail portion 22 and the bend in the line shank 3 in the passage through the front end 21 of the body member 2. The weight member 6 and the movement limiting portions 19 and 20 are positioned on the weight support shaft and the loop portion 18 is then formed in the free end of the weight support shaft 7 after the spinner 8 and swivel 26 are positioned to be mounted on the weight support shaft 7 by the forming of the loop portion 18. The sleeve portion of the skirt 23 is positioned on the tail portion 22 and the wrapping 24 is placed thereon to secure the skirt 23 in position on the body member 2.

To prepare the fishing lure 1 for use, the fishing line 5 is attached to the eye 4 in the line shank 3. A darting-like motion or action of the lure 1 is effected by alternately pulling on and relaxing the pull on the fishing line 5. When the pull on the fishing line 5 is relaxed, the fishing lure 1 falls in the water with the tentacles 25 extending upwardly and outwardly from the body member 2, thereby allowing the spinner 8 to freely rotate. While the lure 1 is sinking through water and when the weight member 6 is resting on a bottom surface, the relative position of the body member 2, link shank 3, and weight member 6 is such that the body member and hook shank are inclined upwardly and rearwardly at an angle of 30 to 45° substantially as illustrated in FIG. 5. This angled position facilitates a fish following and striking the lure to take same. The spacing between the body member 2 and the spinner 8 maintains the tentacles 25 away from the spinner 8 particularly when the fishing lure 1 is being pulled through the water. The hook shank 9, line shank 3, and weight support shaft 7 are coplanar whereby the fishing lure 1 has a minimum resistance or drag when pulled through the water. The fishing lure 1 is particularly adapted to move up and over obstructions, such as items on the bottom of a body of water, without fouling the hook shank 9 and the barb 11 thereon.

It is to be understood that while I have illustrated and described one form of my invention, it is not to be limited to this specific form or arrangement of parts herein described and shown.

What I claim and desire to secure by Letters Patent is:

1. An artificial fishing lure comprising:
   a. a body member having a front end and a rear end, said body member being adapted to float in water;
   b. an elongated hook shank having one end secured in said body member with said shank extending from the rear end of said body member and having a barb on the free end thereof;
   c. said body member being hollow, siad hook shank being fixed relative to said hollow body member and having a substantially straight portion extending from said hollow body member and a downturned portion extending between said straight portion and said barb of said hook shank whereby said barb is below said straight portion of said hook shank;
   d. an elongated stiff wire line shank extending outwardly and downwardly from the front end of said body member and having a lower end provided with a line attaching means;
   e. a weight member connected to said line shank adjacent said lower end thereof in spaced relation to said body member; and
   f. an action member connected adjacent to said line shank lower end and positioned below said body member.

2. An artificial fishing lure as set forth in claim 1 including a skirt secured relative to said body member and having portions extending therefrom and around a portion of said hook shank between said body member and said barb.

3. An artificial fishing lure comprising:
   a. a body member having a front end and a rear end, said body member being adapted to float in water;
   b. an elongated hook shank having one end secured in said body member with said shank extending from the rear end of said body member and having a barb on the free end thereof;
   c. an elongated stiff wire line shank extending outwardly and downwardly from the front end of said body member and having a lower end provided with a line attaching means, said line shank having an eye portion forwardly of and below said body;

d. a weight member connected to said line shank adjacent said lower end thereof in spaced relation to said body member, said weight member being mounted on a weight support shaft having one end thereof connected to said line shank;
e. an action member connected adjacent to said line shank lower end and positioned below said body member;
f. said action member being connected to the other end of said weight support shaft; and
g. said hook shank having a substantially straight portion extending from said body member and a downturned portion extending between said straight portion and said barb of said hook shank whereby said barb is below said body member.

4. An artificial fishing lure as set forth in claim 3 wherein said hook shank and said line shank and said weight support shaft are substantially coplanar.

5. An artificial fishing lure as set forth in claim 4 wherein said body member is hollow, said hook shank and said line shank are connected inside of said hollow body member, said barb is positioned in the plane of said hook shank and said line shank, and said line shank extends downwardly and forwardly from said body member at an obtuse angle relative thereto and the hook shank whereby when the weight rests on bottom surface the body member and hook shank are inclined upwardly and rearwardly.

6. An artificial fishing lure as set forth in claim 4 wherein:
a. said hook shank has an eye portion positioned within said hollow body member;
b. said line shank has a loop portion positioned within said hollow body member;
c. said loop portion of said line shank is received within said eye portion of said hook shank whereby said hook shank and said line shank are connected within said hollow body member;
d. said weight member is rotatably mounted on said weight support shaft.

7. An artificial fishing lure as set forth in claim 6 including a skirt secured relative to said body member and having portions thereof extending around said hook shank between said body member and said barb.

* * * * *